Figure 1:
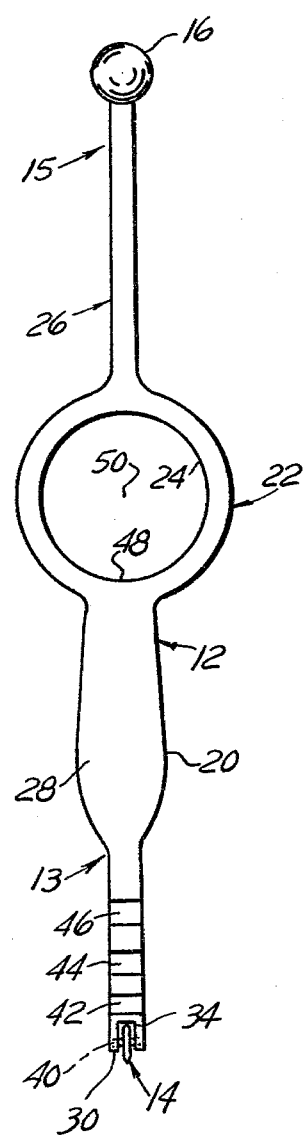

United States Patent [19]

Magewick et al.

[11] 4,224,738
[45] Sep. 30, 1980

[54] PRECISION GLASS CUTTER

[76] Inventors: Aloysius F. Magewick; Elaine M. Magewick, both of 17360 Francavilla, Livonia, Mich. 48152

[21] Appl. No.: 40,450

[22] Filed: May 18, 1979

[51] Int. Cl.³ .............................................. C03B 33/10
[52] U.S. Cl. .................................................. 30/164.95
[58] Field of Search .................... 30/164.95, 164.9, 340

[56] References Cited

U.S. PATENT DOCUMENTS

| | | | |
|---|---|---|---|
| 1,201,515 | 10/1916 | Sidon | 30/164.95 |
| 1,547,451 | 7/1925 | Scott | 30/164.95 |
| 2,516,668 | 7/1950 | Barrett | 30/164.95 |
| 2,892,291 | 6/1959 | Coleman | 30/164.95 |
| 3,138,868 | 6/1964 | Kuthroff | 30/164.95 |
| 4,040,182 | 8/1977 | O'Dell | 30/164.95 |
| 4,087,911 | 5/1978 | Schrock | 30/340 X |
| 4,161,819 | 7/1979 | Pietrantonio | 30/164.95 |

Primary Examiner—Jimmy C. Peters
Attorney, Agent, or Firm—Willis Bugbee

[57] ABSTRACT

To precisely scratch a sheet of glass and then tap it to sever it into two separate pieces of glass while maintaining perpendicularity of the glass cutter handle to the glass surface, without twisting the wrist or arm while applying downward pressure, the rigid handle of this glass cutter approximately midway between the cutting wheel and the upper servering hammer portion is provided with a rigid widened portion through which the user's index finger is inserted during the application by it of downward pressure for scratching the glass. This apertured rigid widened portion is then grasped by the fingers to assist and precisely guide the cutter handle while tapping the scratched glass with the hammer head to separate the glass portions on opposite sides of the scratch.

8 Claims, 2 Drawing Figures

PRECISION GLASS CUTTER

BACKGROUND OF THE INVENTION

Hitherto, glass cutters employing an elongated handle with a sharp cutting wheel at one end and optional ball hammer head at the opposite end have required the user to twist his wrist or arm in order to hold the handle in its proper position perpendicular to the glass surface and at the same time to apply the necessary downward pressure to cause the cutting wheel to scratch the glass. This maintenance of perpendicularity is essential for precision work, especially with fitting pieces of stained glass together. Where, as often occurs, the surface of the glass is undulating or the glass contains bubbles known as "seeds", the encountering thereof by the cutting wheel coupled with the simultaneous application of pressure while attempting to maintain the above-mentioned perpendicularity causes the user to push the cutter handle forward and thus to lose this perpendicularity. This results in the making of an imprecise, irregular and unsatisfactory scratch with the consequent production of irregularly cut glass pieces upon tapping the glass to separate the pieces.

Another prior form of glass cutter possessing the same disadvantage of difficulty in maintaining this perpendicularity and requiring an abnormal and fatiguing twist of the wrist or arm is provided with laterally-projecting arms located between the opposite ends of the handle. Still another prior form of glass cutter possesses a short handle with a ring pivoted thereto at the top thereof on a horizontal pivot axis, with an even worse tendency to "flop over" during scratching and lacking the hammer head to sever the glass into separate pieces on opposite sides of the scratch. The glass cutter of the present invention avoids all these prior disadvantages and maintains this perpendicularity during the application of the downward pressure by the index finger, the axis of which thus automatically coincides with the axis of the handle without necessitating the fatigue-causing twisting of the wrist or arm.

SUMMARY OF THE INVENTION

The present invention principally resides in the provision of an elongated substantially rigid handle with a cutting wheel at its lower end, a hammer portion with a hammer head at its upper end, and a substantially rigid apertured widened portion approximately midway between the cutting wheel and the hammer head ball.

Figure 2:
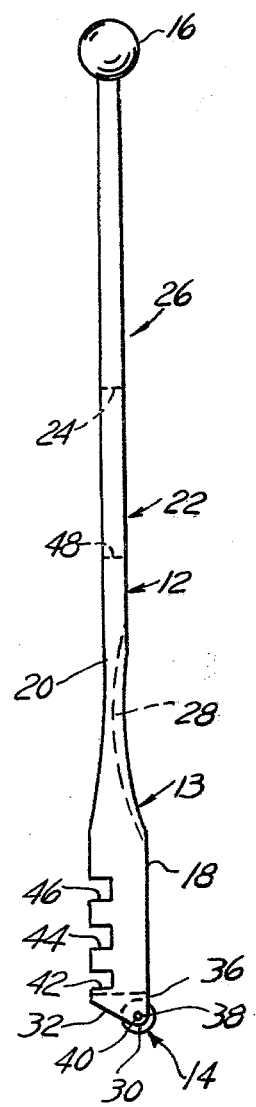

In the drawing,

FIG. 1 is a front elevation of the glass cutter of the present invention according to a preferred form thereof; and FIG. 2 is a side elevation of the glass cutter shown in FIG. 1.

Referring to the drawing in detail, FIG. 1 shows a precision glass cutter, generally designated 10, according to a preferred form of the invention as consisting generally of an elongated handle 12 at the lower end of the lower part 13 of which is rotatably mounted a sharp-edged glass cutting wheel 14, the upper part 15 of the handle 12 comprising a hammer with a head in the form of a ball 16 for severing the glass after it has been provided with a deep penetrating scratch by the glass cutting wheel 14, as explained more fully below. The handle 12 is subdivided into a narrowed lower end portion 18 immediately above which is a lower widened finger tip rest portion 20. At the top of the finger tip rest portion 20 is an upper apertured widened portion 22 of annular form provided with a forefinger aperture 24. From the upper end of the upper widened portion 22 a stem 26 extends rigidly upward to the hammer head ball 16. The lower widened handle portion 20 is provided with a concavity 28 (FIG. 2) for receiving the user's forefinger tip.

The tip 30 of the lower end portion 18 has an upwardly and rearwardly-inclined surface 32 from which a slot 34 extends horizontally to the front edge 36. Extending across the tip 30 is a horizontal bore 38 in which is mounted the axle 40 of the sharp-edged hardened steel cutting wheel 14. The lower end portion 18 above the slot 34 and wheel 14 is provided with a plurality of rectangular notches 42, 44 and 46 of increasing width for receiving and engaging the edge portions of glass of corresponding varying widths to be cut by the precision glass cutter 10. As seen by a comparison of FIGS. 1 and 2, the lower end portion 18 is narrow when viewed in front elevation (FIG. 1) and widened when viewed in side elevation (FIG. 2). The bottom portion 48 of the finger aperture 24 in the upper widened portion 22 constitutes a forefinger pressure application location at which the downward pressure of the rearward part of the forefinger is exerted when the forefinger has been passed through the aperture 24 and its finger tip is resting against the concavity 28 in the lower widened portion 20 of the handle 12 while the narrowed lower end portion 18 is held firmly between the thumb and middle finger. It will be seen from FIG. 1 that under these circumstances the cutting wheel 14, the axis of the lower part 13, the center 50 of the aperture 24 and consequently the axis of the forefinger while making a cutting scratch pass through a common plane which also includes the axis of the stem 26 of the upper part 15 and center of the hammer head ball 16. It will also be seen from the discussion below of the operation of the invention that this axis is maintained perpendicular to the surface of the glass being cut when the cutting tool 10 is being properly used. It will be further understood that the apertured upper widened portion 22, the lower part 13 containing the lower widened portion 20 and the lower end portion 18 of the handle 12 are substantially rigid and integral with one another, as is also preferably the upper part 15 with its hammer head ball 16.

In the operation of the invention, to make a deep penetrating scratch in the surface of the sheet of glass to be cut, the operator first thrusts his index finger or forefinger through the aperture 24 and causes the finger tip thereof to rest against the concavity 28 while the tips of his thumb and middle finger firmly grasp the lower handle portion 18 between them. While holding the handle 12 vertical so that it is perpendicular to the surface of the glass to be cut, he draws the glass cutter 10 along the projected line of cut, thereby causing the cutting wheel 14 to make a scratch in response to downward pressure exerted by the rearward portion of the forefinger against the bottom 48 of the finger aperture 24. Due to the substantially rigid construction of the portion 48 with the handle portions 18 and 20, and to the centration of the index finger with the axis of the handle 12, there is no tendency for the glass cutter to tilt from its perpendicular portion, and there is no requirement of twisting of the wrist or forearm to maintain the proper position of the glass cutter 10 during operation. Furthermore, due to the elimination of this wrist or forearm twisting, the user does not become fatigued with its extended use, as occurs in the extended use of the conventional glass cutter requiring such wrist or forearm twisting and lacking the substantial rigidity of the present glass cutter 10 of the present invention.

After the scratch has been made in the above-described manner, the operator reverses the position of the glass cutter 10 by extending the upper part 15 containing the stem 26 and hammer head ball 16 forward while holding the lower part 13 containing the handle portions 20 and 22 between his fingers. He then taps the glass along the line of the scratch which has been made by the cutting wheel 14, causing the portions on opposite sides of the scratch to part cleanly and precisely. This is particularly important when stained glass is being cut because the required cutting lines are frequently irregular and not straight, in order that the differently-colored pieces will fit together properly.

In addition to greatly reducing fatigue, the present glass cutter eliminates the necessity, with previous glass cutters, of having to grip the glass cutter between the fingers with a heavier pressure because of the twisted wrist or forearm position required. This causes the fingers to slide downward along the lower end portion 18. Furthermore, as a result of the improved construction set forth above, the present glass cutter 10 possesses much greater precision in making cuts than is possessed by the conventional glass cutter, particularly in the hands of an inexperienced operator.

We claim:

1. A precision fatigue-reducing glass cutter, comprising
an elongated substantially rigid upright glass cutter handle structure including an upper part, a lower part, and an intermediate part disposed between said upper part and said lower part in interconnecting relationship therewith,
said intermediate part being wider than said upper part and said lower part and having a forefinger-receiving aperture therethrough,
and a glass-cutting element mounted on the lower end of said lower part.

2. A precision fatigue-reducing glass cutter, according to claim 1, wherein said parts have a central substantially rectilinear axis, and wherein said aperture has a forefinger pressure application spot aligned with said central axis.

3. A precision fatigue-reducing glass cutter, according to claim 2, wherein said glass-cutting element is also aligned with said central axis.

4. A precision fatigue-reducing glass cutter, according to claim 2, wherein said lower part has a forefinger tip rest disposed between said intermediate part and said glass-cutting element and aligned with said axis.

5. A precision fatigue-reducing glass cutter, according to claim 4, wherein said forefinger tip rest comprises a concavity in said lower part.

6. A precision fatigue-reducing glass cutter, according to claim 1, wherein said upper part has a tapping-applicator at its upper end.

7. A precision fatigue-reducing glass cutter, according to claim 6, wherein said tapping applicator comprises a ball.

8. A precision fatigue-reducing glass cutter, according to claim 2, wherein said intermediate part is of annular configuration having its center aligned with said central axis.

* * * * *